May 16, 1933.  J. A. CLARKE, JR  1,909,044
AUTOMATIC CONTROL SYSTEM
Filed Oct. 6, 1930
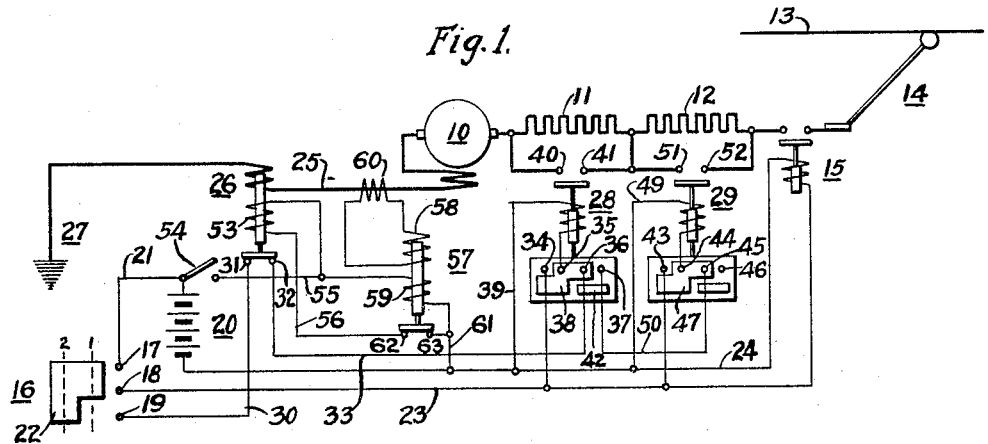
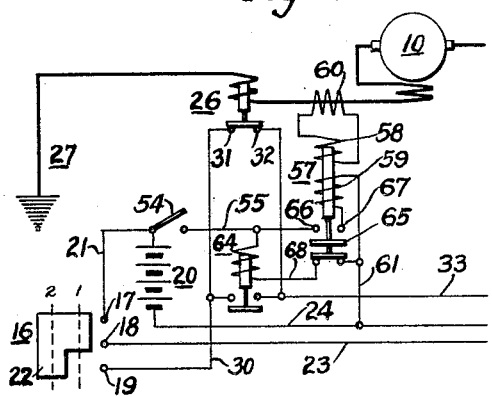
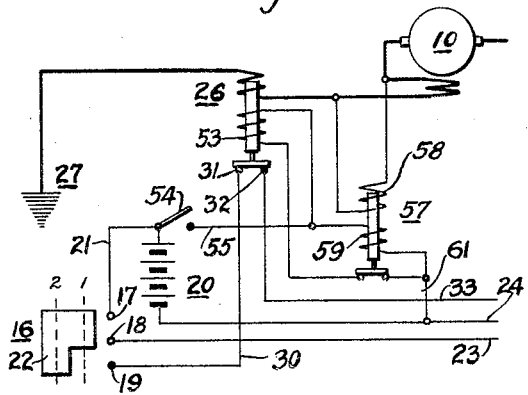
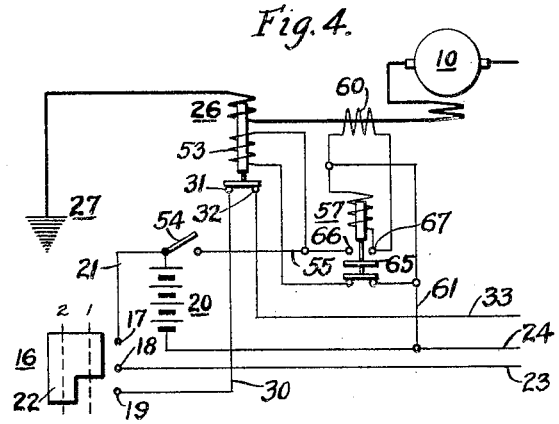
INVENTOR
John A. Clarke, Jr.
BY
ATTORNEY Patented May 16, 1933

1,909,044

UNITED STATES PATENT OFFICE

JOHN A. CLARKE, JR., OF PITTSBURGH, PENNSYLVANIA, ASSIGNOR TO WESTINGHOUSE ELECTRIC & MANUFACTURING COMPANY, A CORPORATION OF PENNSYLVANIA

AUTOMATIC CONTROL SYSTEM

Application filed October 6, 1930. Serial No. 486,593.

My invention relates generally to control systems for motors and more particularly to control systems for the propelling motors of vehicles.

The object of my invention is to provide for manually controlling the operation of the accelerating switches of an automatic accelerating system when the motor fails to start or accelerate, to increase the motor current and to develop the desired torque.

Other objects of the invention will, in part, be obvious and will, in part, appear hereinafter.

The invention, accordingly, is disclosed in the embodiment thereof shown in the accompanying drawing and comprises the features of construction, combination of elements and arrangement of parts which will be exemplified in the construction hereinafter set forth, and the scope of the application of which will be indicated in the claims.

For a further understanding of the nature and objects of the invention, reference should be had to the following detailed description, taken in connection with the accompanying drawing, in which Figure 1 is a diagram of the apparatus and the circuits of a motor-control system embodying my invention, and Figs. 2, 3 and 4, are diagrams of modifications of means provided for affording manual control of the automatic accelerating system.

Referring now to the drawing, 10 designates, generally, a motor, of any suitable type, for propelling a vehicle or operating a stationary machine. In this particular embodiment of the invention, only two resistor sections 11 and 12 are connected in series-circuit relation to the motor for controlling its acceleration but it will be readily understood that any desired number of resistor sections may be utilized.

As shown, a trolley conductor 13 is provided to supply power to the motor 10. The motor is connected to the trolley conductor by means of a trolley pole and wheel 14. The circuit to the motor may be controlled in any suitable manner. In this instance, an electromagnetic switch 15 is provided and is disposed to be actuated upon the operation of the controller 16.

The functioning of the control system, when the motor starts and automatically accelerates, will be described first and then a detailed description will be given of the means for manually closing the accelerating switches.

Assuming that it is desired to start and accelerate the motor 10, the controller 16 is advanced to position 1. When the controller stands in position 1, the contact fingers 17 and 18 are bridged, and an actuating circuit is established for the switch 15 which extends from one terminal of the storage battery 20, through conductor 21, contact fingers 17 and 18—bridged by the segment 22 of the controller 16—conductor 23, the actuating coil of the switch 15 and conductor 24, to the other terminal of the battery. In such manner, line switch 15 is closed to establish a motor circuit.

The motor circuit may be traced from the trolley conductor 13, through the trolley wheel and pole 14, switch 15, resistor sections 12 and 11, motor 10, conductor 25 and the main coil of a current-limit relay 26, to ground at 27.

Following the initial rush of current, the current-limit relay 26 is actuated to its raised position but, when the motor starts, the counter-electro-motive force developed in the motor decreases the flow of current, and the current-limit relay 26 drops to its lowermost position.

Assuming that the controller 16 is advanced to its second position, circuits are established in a predetermined order for actuating the accelerating switches 28 and 29. The first switch-actuating circuit established extends from one terminal of the battery 20, through conductor 21, contact fingers 17 and 19—bridged by the contact segment 22 of the controller 16—conductor 30, contact fingers 31 and 32—bridged by the current-limit relay 26—conductor 33, contact fingers 36 and 35—bridged by the interlock 38—actuating coil of the switch 28 and conductors 39 and 24, to the other terminal of the battery. The switch 28 is actuated to bridge contact fingers 40 and 41 and thereby shunt the resistor section 11.

When the resistor section is shunted, there will be an increase in the motor current and the current-limit switch 26 will be actuated to its uppermost position. If the load carried by motor 10 permits the motor to accelerate, the current will be decreased, and the current-limit relay 26 will drop and bridge the contact fingers 31 and 32.

When the current-limit switch 26 stands in its lowermost position, another switch-actuating circuit is established which extends from the energized conductor 33, through contact fingers 36 and 37—bridged by the interlock 42—conductor 50, contact fingers 45 and 44—bridged by interlock 47—the actuating coil of switch 29 and conductors 49 and 24, to the battery. The switch 29 is actuated to bridge contact members 51 and 52 and shunt the resistor section 12.

As will be observed, the resistor sections 11 and 12 are shunted out of the motor circuit which now extends from the trolley conductor 13, through trolley pole 14, switches 15, 29 and 28, motor 10, conductor 25 and the actuating coil of the current-limit-relay 26, to ground at 27.

Assuming that the controller 16 is actuated to start and accelerate the motor 10, and that the motor does not develop sufficient torque to accelerate, it is necessary to shunt the resistors 11 and 12 to increase the current supplied to the motor in order to develop a greater torque.

It will be readily understood that, when the switch 15 is closed, there will be an initial rush of current sufficient to operate the current-limit relay 26. Since the motor fails to start, the current-limit relay 26 will remain in its uppermost position, and an actuating circuit for the accelerating switch 28 cannot be established until the relay drops or is actuated to its lowermost position, where it bridges the contact members 31 and 32.

In order to provide for manually controlling the operation of the switches 28 and 29, provision is made for closing the relay 26. As shown, an auxiliary coil 53 is provided on the current-limit relay 26 that is differentially wound to oppose the main coil. A manually operable switch 54 is provided for controlling the energization of the auxiliary coil 53.

Assuming that the motor 10 has failed to start and that the current-limit relay 26 stands in its uppermost position, and that it is desired to actuate switch 28 to shunt the resistor section 11, switch 54 is actuated to its closed position to establish an energizing circuit for the coil 53. When the switch 54 is closed, a circuit is established which extends from one terminal of the battery 20, through switch 54, conductor 55, coil 53, conductor 56, contact fingers 62 and 63 of the relay 57 and conductor 24, to the other terminal of the battery.

Since the coil 53 is differentially wound, relative to the main coil, it will so weaken the magnetic field of the relay 26 that the movable member of the relay will drop to its closed position to bridge contact members 31 and 32 and establish the actuating circuit traced hereinbefore for the accelerating switch 28. As will be readily understood, when the accelerating switch 28 is actuated, the resistor section 11 is shunted to permit an increase in the motor current and the development of a greater starting torque.

In the operation of motors, since it is undesirable to subject them to an excessive overload, it is advisable to provide some means for limiting the number of resistor sections that may be shunted upon the operation of the switch 54 to its closed position.

In this embodiment of the invention, a notching relay 57 is provided to interrupt the energizing circuit of the auxiliary coil 53, as a resistor section is shunted to cause an increase in the current delivered to the motor. As will be readily understood, the relay 57 may be connected in the circuit in many different ways, four methods being illustrated in the drawing.

Referring to Fig. 1, in particular, the relay 57 is illustrated as being provided with two coils 58 and 59 which are cumulatively wound. The coil 59 is capable of retaining the relay in its raised position but is not capable of actuating it. As shown, the coil 59 is connected across the battery 20, when the switch 54 is closed.

The coil 58 is inductively associated with the motor or motor circuit so that, when the current is changing in the motor circuit, it will be energized. As shown, the coil 58 is connected in series circuit with a coil 60 which is looped about the conductor 25.

When the switch 54 is closed, a circuit is established which extends from one terminal of the battery 20, through switch 54, conductor 55, coil 59 of the relay 57 and conductors 61 and 24, to the other terminal of the battery. In this manner, the coil 59 is energized, but the relay 57 is not actuated to its uppermost position.

When the accelerating switch 28 is closed, the motor current is suddenly increased to energize the coils 60 and 58. Since the coils 58 and 59 are cumulatively related, the relay 57 is actuated to interrupt the energizing circuit of the coil 53 of the current-limit relay 26.

When the motor current reaches a constant value, the coil 58 of the relay 57 is deenergized, but the coil 59 remains energized and is capable of retaining relay 57 in its raised position. As will be readily understood, when the coil 53 of the relay 26 is deenergized, the relay is actuated to its uppermost position, and an actuating circuit for the accelerating switch 29 cannot be established. In such manner, provision is made for limiting the number of accelerating switches that may be actuated upon the closure of the manually-operable switch 54.

In order to release the relay 57 to permit the establishment of an energizing circuit for the coil 53, it is necessary to open the switch 54, thereby deenergizing the coil 59 of the relay 57. When the coil 59 is deenergized, the relay 57 drops to its lowermost position to bridge the contact members 62 and 63. If the engineer desires to close another accelerating switch, as, for example, the switch 29, he operates the switch 54 to its closed position to reestablish the energizing circuit for the coil 53. In this manner, he affects the closure of the current-limit relay 26, and the actuating circuit hereinbefore described is established to close the accelerating switch 29.

From the foregoing, it will be clear that provision is made for assuming manual control of the automatic accelerating system to affect the closure of the accelerating switches, one at a time. However, it will be readily understood that, if there is a large number of accelerating switches, they may be closed in groups.

Referring to the modification illustrated in Fig. 2, instead of putting a differential coil 53 on the current-limit relay 26, a second relay 64 is provided which is disposed to shunt the current-limit relay 26. As shown, the actuating coil of the relay 64 is disposed to be energized when the manually-operable switch 54 is closed. The relay 57 is provided with an interlock 65 to bridge contact members 66 and 67 and thus establish a holding circuit when the relay 57 is actuated to its uppermost position, as a result of the energization of the coil 58, caused by a change in the motor current.

In the operation of the control system, when the switch 54 is closed, a circuit is established which extends from one terminal of the battery 20, through switch 54, conductor 55, the actuating coil of relay 64, conductor 68, relay 57 and conductors 61 and 24, to the other terminal of the battery. In such manner, the relay 64 is actuated to establish an energizing circuit for the accelerating switch 28. After the accelerating switch 28 is closed, there will be a sudden increase in the motor current, and the relay 57 will be actuated to its uppermost position to establish a holding circuit which extends from the energized conductor 55, through the contact members 66 and 67—bridged by the interlock 65—the coil 59 of the relay 57 and conductors 61 and 24, to the battery. Therefore, the relay 57 is retained in its uppermost position until the switch 54 is opened to interrupt the holding circuit. It will be evident, therefore, that only one actuating switch may be closed each time the manually operable switch 54 is closed.

The system shown in Fig. 3 is similar to the system illustrated in Fig. 1, with the exception that the coil 58 of relay 57 is connected across the series field of the motor 10. Therefore, the operation of the relay 57 will depend upon the voltage drop across the series field of the motor.

The control system disclosed in Fig. 4 is substantially the same as the system illustrated in Fig. 1, with the exception that a holding coil 59, shown in Fig. 1, is dispensed with and, instead, the relay 57 is provided with an interlock 65 for establishing a holding circuit when the relay is actuated. The holding circuit established is similar to the holding circuit established in the system disclosed in Fig. 2.

Since certain changes may be made in the above construction and different embodiments of the invention may be made without departing from the scope thereof, it is desired that all matter contained in the above description or shown in the accompanying drawing shall be interpreted as illustrative and not in a limiting sense.

I claim as my invention:

1. In a motor-control system, in combination, a motor, a source of power for the motor, a plurality of resistor sections for controlling the supply of current to the motor, means for shunting the resistor sections in a predetermined sequence to start and accelerate the motor, means for limiting the number of resistor sections that may be shunted if the motor fails to start or accelerate, means for actuating said limiting means to effect the operation of the resistor shunting means to shunt the resistor sections to increase the motor current, and means responsive to changes in the motor current for limiting the number of resistor sections that may be shunted at one time by the operation of the last named means.

2. In a motor-control system, in combination, a motor, resistor sections connected in series-circuit relation to the motor, accelerating switches for shunting the resistor sections, means for actuating said accelerating switches in a predetermined sequence, means, responsive to predetermined motor currents, for interrupting the functioning of said switch-actuating means, means disposed to be controlled manually for effecting the operation of said current-responsive means to cause the actuation of the accelerating switches to provide for increasing the motor current to develop a predetermined torque for starting or accelerating the motor, and means responsive to changes in the motor current for limiting the number of accelerating switches that can be caused to be actuated by one operation of said manually-controlled means.

3. In a motor-control system, in combination, a motor, a plurality of resistor sections connected in series-circuit relation to the motor, accelerating switches for shunting the resistor sections, a limit switch responsive to the motor current to control the operation of the accelerating switches, manually controlled means for actuating the limit switch to effect the operation of predetermined accelerating switches to increase the motor current, and means responsive to changes in the motor current for rendering the means for actuating the limit switch ineffective after predetermined accelerating switches are actuated to shunt resistor sections and increase the motor current.

4. In a motor-control system, in combination, a motor, a plurality of resistor sections connected in series-circuit relation to the motor, accelerating switches for shunting the resistor sections, means for automatically operating said accelerating switches in a predetermined sequence, a limit switch responsive to the motor current for interrupting the progressive operation of the accelerating switches if the motor fails to start or accelerate, means for causing the actuation of the limit switch independently of the motor current to effect the closure of another accelerating switch after the automatic acceleration has been discontinued, and means responsive to changes in the motor current to limit the number of accelerating switches that may be closed in successive relation by effecting the operation of the limit switch independently of the motor current.

5. In a motor-control system, in combination, a motor, means for starting and automatically accelerating the motor, a limit switch connected in the motor circuit and responsive to the motor current for controlling the operation of said starting and accelerating means, means disposed to be manually controlled for actuating the limit switch to effect another step in the operation of the accelerating means if the motor fails to start or accelerate to increase the motor current and develop a greater torque, and means responsive to changes in the motor current for limiting the number of steps that may be taken by said automatic accelerating means upon the operation of said manually controlled means, whereby the current that may be supplied to the motor to effect starting or acceleration is limited.

6. In a motor-control system, in combination, a motor, a plurality of resistor sections connected in series-circuit relation to the motor, a plurality of accelerating switches for shunting the resistor sections, means for automatically operating said accelerating switches in a predetermined order to effect starting and acceleration of the motor, a limit switch responsive to the motor current for limiting the operation of said means for automatically actuating the accelerating switches, means disposed to be manually controlled to effect the actuation of the limit switch to continue the operation of the accelerating switches, and means associated with the motor and responsive to the motor current for interrupting the functioning of said manually controlled means provided for effecting the actuation of the limit switch to continue the operation of said accelerating switches.

In testimony whereof, I have hereunto subscribed my name this first day of October, 1930.

JOHN A. CLARKE, Jr.